US006965637B2

(12) United States Patent
Davis et al.

(10) Patent No.: US 6,965,637 B2
(45) Date of Patent: Nov. 15, 2005

(54) SYSTEM AND METHOD FOR CONTROLLING LINE DRIVER POWER IN A SHARED DIGITAL SUBSCRIBER LINE MODEM

(75) Inventors: Gordon Taylor Davis, Chapel Hill, NC (US); Jeffrey Haskell Derby, Chapel Hill, NC (US); Evangelos Stavros Eleftheriou, Zurich (CH); Sedat Oelcer, Au (CH); Malcolm Scott Ware, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 775 days.

(21) Appl. No.: 09/813,558

(22) Filed: Mar. 21, 2001

(65) Prior Publication Data

US 2002/0136283 A1 Sep. 26, 2002

(51) Int. Cl.[7] .............................. H04B 1/38; H04L 5/16
(52) U.S. Cl. ..................................................... 375/222
(58) Field of Search ................................ 375/219, 220, 375/222, 257, 260; 379/93.07, 93.14; 370/389, 370/390, 398, 419, 420; 709/236, 238, 244

(56) References Cited

U.S. PATENT DOCUMENTS

| | | | | |
|---|---|---|---|---|
| 5,818,911 A | * | 10/1998 | Kawashima | 379/93.07 |
| 5,999,565 A | * | 12/1999 | Locklear et al. | 375/222 |
| 6,014,431 A | | 1/2000 | McHale et al. | 379/93.14 |
| 6,018,529 A | | 1/2000 | Toth | 370/463 |
| 6,052,380 A | | 4/2000 | Bell | 370/445 |
| 6,262,991 B1 | * | 7/2001 | Dyke et al. | 370/420 |
| 6,304,579 B1 | * | 10/2001 | Malik | 370/432 |
| 6,424,674 B1 | * | 7/2002 | Linz et al. | 375/220 |

FOREIGN PATENT DOCUMENTS

| | | | | |
|---|---|---|---|---|
| EP | 0981222 | 2/2000 | | H04L 5/06 |
| EP | 0981242 | 2/2000 | | H04M 11/06 |

* cited by examiner

*Primary Examiner*—Betsy L. Deppe
(74) *Attorney, Agent, or Firm*—Joscelyn G. Cockburn

(57) ABSTRACT

A shared digital subscriber line modem achieves reduced total power consumption and data security by generating and transmitting a physical data frame which includes a control channel and a data field to only the connected client modem associated with the intended recipient. A second physical frame which does not include the data field is generated and transmitted to all of the other connected client modems. This method results in a reduction in the power required and provides improved data security by preventing data access to non-addressed client modems.

15 Claims, 4 Drawing Sheets

SYSTEM AND METHOD FOR CONTROLLING LINE DRIVER POWER IN A SHARED DIGITAL SUBSCRIBER LINE MODEM

FIELD OF THE INVENTION

The present invention relates generally to communication systems and more particularly to a system and method for controlling the line power requirements of shared Digital Subscriber Line (DSL) transmitters.

BACKGROUND OF THE INVENTION

Asymmetrical Digital Subscriber Line (ADSL) modems offer a high speed alternative (up to 8 Mbps, depending on line conditions) to conventional analog modem technology. U.S. patent application Ser. No. 09/135,221, (now U.S. Pat. No. 6,498,806) filed, Aug. 17, 1998, issued Dec. 24, 2002 and assigned to the same assignee as this application, is incorporated by reference herein. Patent application Ser. No. 09/135,221, hereafter referred to as the 98 application, is directed to a shared asymmetric subscriber line modem. The 98 application introduced the concept of using a single multidrop modem in a central office Digital Subscriber Line Access Multiplexer (DSLAM) to drive multiple subscriber lines. Line sharing was implemented by allocating a small portion of the available bandwidth to a control channel which was used to indicate to a group of client modems which one of the client modems was the intended recipient of a corresponding physical frame of data. This solution resulted in a significant simplification of the digital portion of the ADSL server modem as well as the Digital to Analog converter. This solution requires a separate line driver for each of the subscriber lines. While this is not a major cost consideration, the power dissipated in each of these line drivers becomes a limiting factor in achieving higher levels of integration on ADSL server line circuit cards.

SUMMARY OF THE INVENTION

The invention contemplates a shared (DSL) modem for generating a physical data frame including a control channel indicating which one of a plurality of client devices connected via subscriber lines to the modem is the intended recipient of the data frame and transmitting the generated physical data frame over the subscriber line connected to that client device. Contemporaneously, transmitting a different physical frame including the same control channel only or the same control channel and a low power signal suitable for synchronization onto the subscriber lines connected to the non selected client devices connected to the SDSL.

An object of the invention is to substantially reduce the overall power requirements of the line drivers connected to the DSLs by limiting the bandwidth of the signal transmitted to all of the subscriber lines except the subscriber line connected to the intended recipient of a physical data frame.

Another object of the invention is to enhance data security in a multi-drop modem by deleting the data portion of the physical frame transmitted to the intended recipient from the frames transmitted to all of the lines except the line connected to the intended receiver.

DETAILED DESCRIPTION OF THE INVENTION

Figure 1:
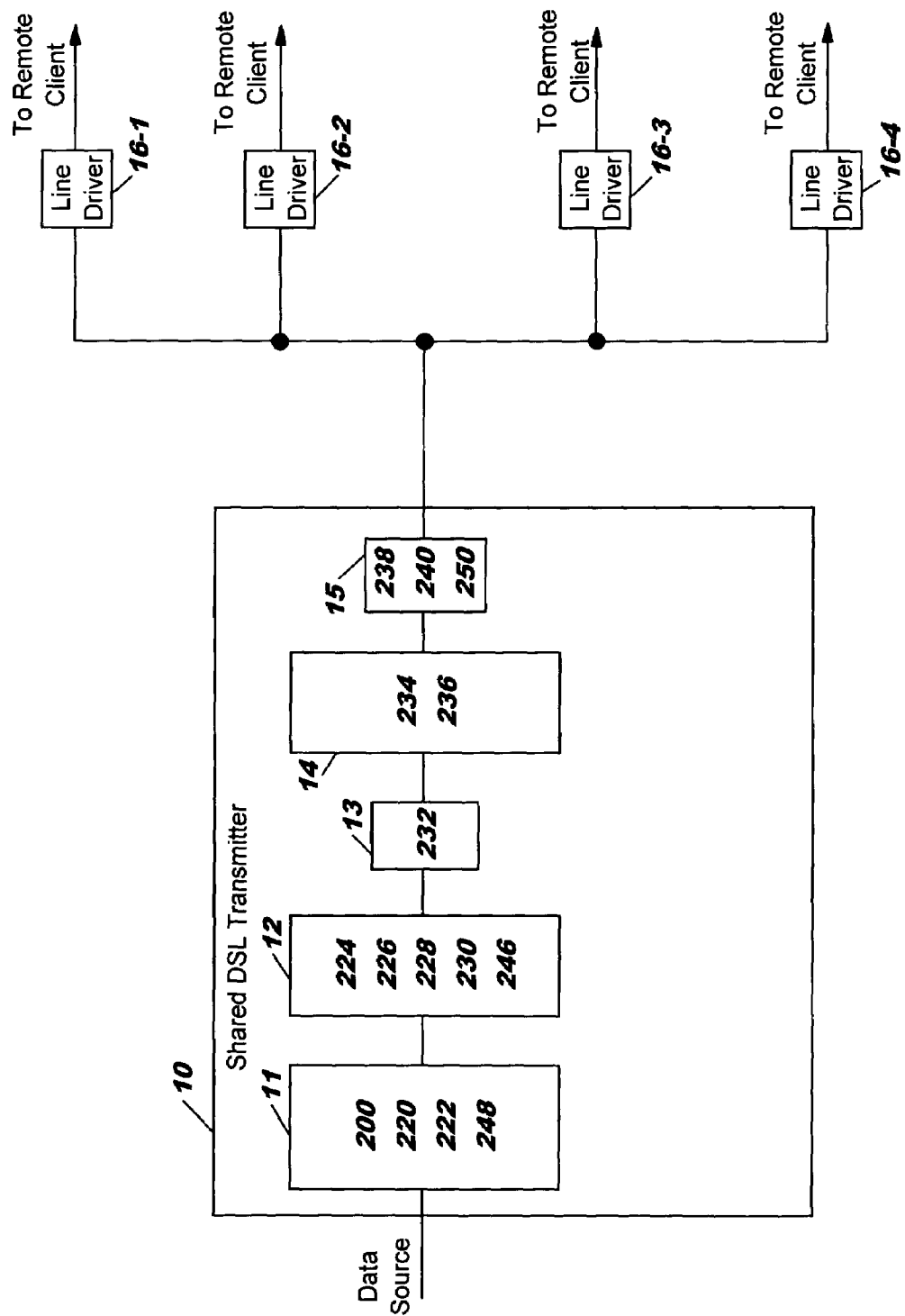
FIG. 1 is an abbreviated version of the transmit portion of the multi-drop server modem illustrated in FIG. 7 of the 98 application; and, FIGS. 2, 3 and 4 are block diagrams of different embodiments of the transmitter of a shared multi-drop modem constructed according to the present invention.

The block diagram illustrated in FIG. 1 is a condensed version of only the transmit portion of the shared Digital Subscriber Line (DSL) server modem illustrated in FIG. 7 of the 98 application. The receive portion of the shared DSL server modem illustrated in FIG. 7 of the 98 application has not been reproduced in FIG. 1 since the receiver portion is not relevant to the invention presented in this application.

The shared DSL transmitter 10 includes a block 11 which assembles the data signal (from a source not shown) destined for one of the client stations. Block 11 includes the following functional components illustrated in FIG. 7 of the 98 application; digital interface 200, L2 framing and CRC generator 220, packet buffer 222 and client specific block 248.

Block 12 prepares the assembled data in a format suitable for transmission and includes data encoder 224 which scrambles Reed-Solomon codes, interleaves the packets and orders the tones in accordance with client variables previously determined by measuring the characteristics of the DSL over which the client is connected to the shared DSL transmitter 10; symbol buffer 226; symbol mapping and gain scaling 228 which is customized by client specific variables 246; and symbol buffer 230.

Block 13 includes an Inverse Discrete Fourier Transform (IDFT) or an Inverse Fast Fourier Transform (IFFT) 232 which converts the complex frequency domain symbols to real time domain symbols.

Block 14 includes symbol buffer 234 connected the output of IDFT 232 and a parallel to serial converter 236 for receiving the content of symbol buffer 234. The output of converter 236 is applied to block 15 which includes D/A converter 238 controlled by timing and control 250 and the transmission filter 240.The output of block 15 is applied to line drivers 16-1–16-n.

Data to be transmitted is partitioned into a series of blocks, where each data block consists of all data to be transmitted via a specific physical frame. A physical frame is defined as that portion of a sequence of time-domain samples of the signal transmitted over the line that results from one Inverse FFT operation in a DSL transmitter. The number of bits assigned to each block is a function of the bit rate negotiated for the link (e.g. number of tone frequency bands, complexity of modulation in each frequency band). Each block is further partitioned into a control field containing control data according to the operation of the subject invention, one or more fields containing user data, and one or more fields used for standard overhead and maintenance functions. The bits from each field are modulated to generate the corresponding signal components of the physical frame. This physical frame consists of a control channel signal component carrying control data from the control field, one or more data channel signal components carrying user data from corresponding user data fields, and possibly one or more overhead channel signal components carrying data to support various other overhead and maintenance functions. Note that in actual implementations various overhead and maintenance fields are transmitted in addition to user data fields, but within the context of the subject invention they can be considered equivalent to additional data fields.

In order to better understand the invention disclosed in this application one needs to compare FIG. 1 of this application (the abbreviated version of the transmit portion of FIG. 7 in the 98 application) to FIG. 2 which will be described below. In FIG. 1, data destined for a specific client is enclosed in a frame which includes a control field. The control field includes the identity of the client the frame is directed to. This frame is transmitted, at full power, to all of the clients connected to shared DSL modem. Only the identified client is authorized to receive the frame. The others will normally discard frames not specifically directed to them.

This mode of operation, while satisfactory, is not optimum. Since the signal transmitted to the non-addressed clients are transmitted at full power it places a burden on the design requirements of the circuit card(s) used to implement the shared DSL modem. In addition, the specific client data sent to the other non-addressed clients served by the shared DSL modem poses a potential security risk.

Figure 2:
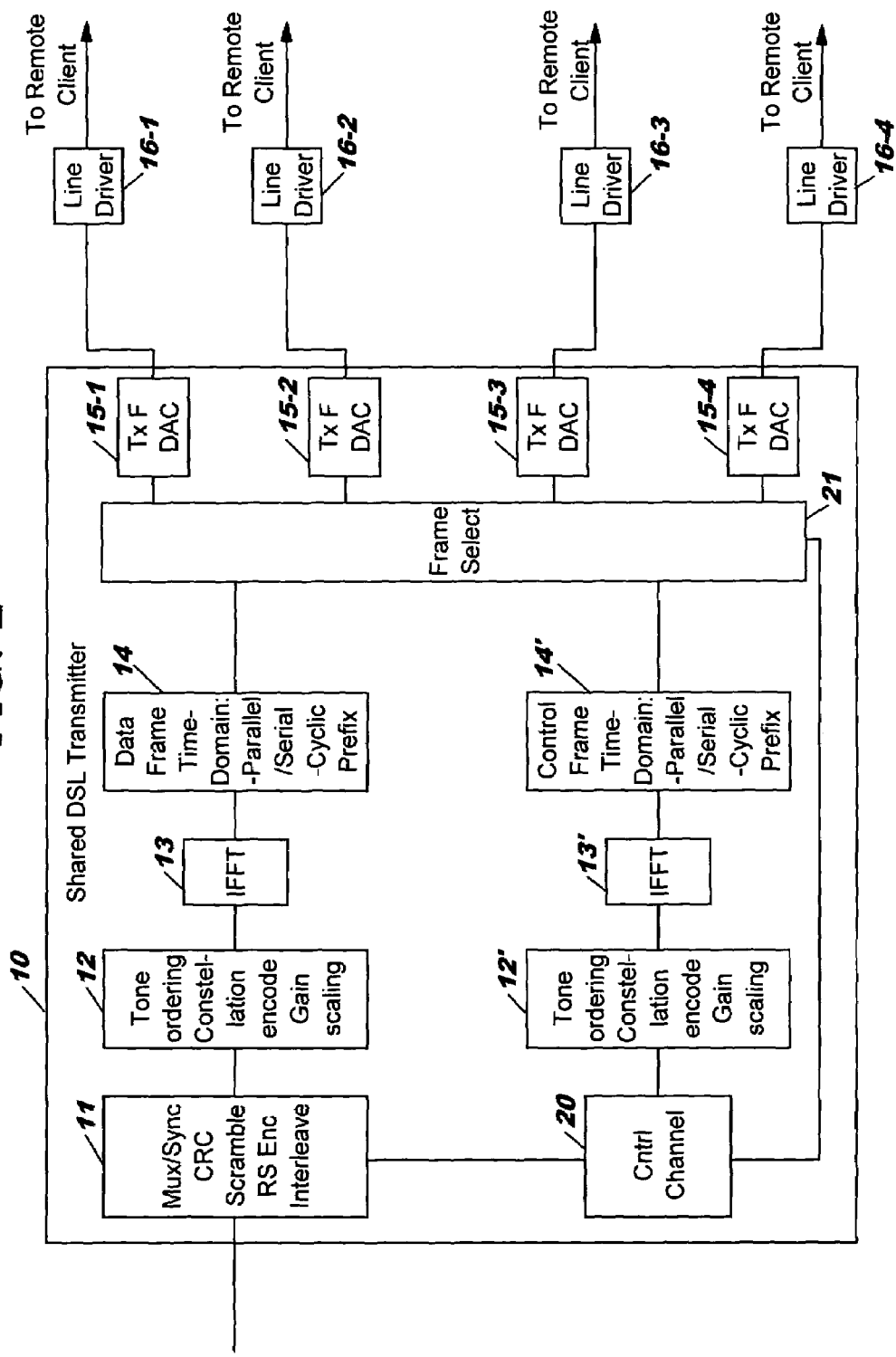

In the block diagram of FIG. 2 blocks which are identical in function and structure bear the same reference numerals as used in FIG. 1 and blocks which are only structurally the same bear the same reference numeral primed. In FIG. 2 blocks 11, 12, 13 and 14 perform the exact same function as the similarly numbered blocks in FIG. 1. A control channel 20 receives sufficient information from block 11 to generate a frame which includes the same control channel which was included in the frame generated in block 11 (the data portion included in the frame prepared in block 11 is eliminated). In this regard the information can take several forms. At a minimum the information must include the identity of the client which is to receive the frame in process. It could include the entire frame prepared in block 11 or some other subset thereof. In any event the control channel will generate a second frame which includes only a control channel identical to the control channel generated in block 11 or it may include in addition a low power synchronization field. The control channel sends this truncated frame to block 12' which is structurally identical to block 12. The frame from block 12' passes through blocks 13' and 14' which are structurally identical to block 13 and 14,respectively. Since blocks 11 and 20 are operating on the same input data the generation of the control channel could utilize common hardware or it could be accomplished by simply stripping the data portion of the frame generated in block 11 in block 20 and adding a low power synchronization signal if deemed prudent.

Control channel 20 sends the identity of the client modem, to which the frame is addressed, to a frame select switch 21. Switch 21 receives the inputs from blocks 14 and 14' and sends the frame from block 14 to a TX filter/DAC 15-$i$ where $i$ is the TX filter/DAC connected to the line driver 16-$i$ which provide a path to the client modem identified in the control channel as the recipient of the frame. Switch 21 sends the frame from 14' to all of the TX filter/DACs except 15-$i$. With this arrangement full power is only applied to line driver 16-$i$. The other line drivers receive only the control channel or the control channel and a low power synchronization signal if the alternative is chosen. This arrangement results in a significant reduction in the total power required in the line driver circuits. Alternatively, switch 21 could be designed to examine the contents of the control channel and perform the described switching function based on that information. Such a modification would be functionally equivalent.

Instead of driving all client lines with the same signal, the subject invention creates a second frame of time domain samples which contains a subset of the tones used for a full data frame. This is done by eliminating all tone frequency samples modulated with client data, leaving only a small subset of tones (those allocated to the control channel, in addition to those tones required to maintain timing within each remote client device, e.g. pilot tone) as input to a second Inverse FFT (IFFT). Note that it is the signal component from these control tones which is used by each client to determine whether or not a particular data frame is intended for that client. In actual implementation, the fact that most input samples are zero may simplify the computational complexity of the second IFFT. Likewise, further simplification in computational complexity may be possible due to the fact that the control tone samples are used for both IFFT computations. In any case, the time-domain samples resulting from the second IFFT are processed through the same time-domain functions (Parallel-to-serial conversion, adding of cyclic prefix) as used for the data frames. For each frame time, there are then two frame buffers, one holding the time samples of a data frame (including control information) and the other holding time samples of a corresponding frame which includes only control information but no data. In an alternate (functionally equivalent) implementation, control channel content may be processed through some frequency domain functions along with the data content, processed up to the full IFFT, and then the frequency samples modulated with client data can be zeroed out to generate input for the control frame IFFT. Note that regardless of the specific implementation options selected, a single FFT hardware assist unit could likely be shared for both IFFT computations. Alternatively, the two IFFT computations could possibly be implemented as two calls to a common IFFT subroutine running on a programmable Digital Signal Processor.

Another alternate implementation option would be to define a low-power idle pattern for data tones in the control frame, instead of just setting the amplitudes of these tones to zero. Since constellation points are not equally spaced from the origin in the modulation of each tone, a subset of constellation points can usually be chosen which will average substantially less power than if the same tone evenly distributed its signal across all constellation points. This option may help the client receivers avoid issues relating to the dynamic transitions between data frames and control frames, and may facilitate continued tracking of timing and gain adjustments. Transmitter control functions may also be implemented to group multiple data frames to a single client device prior to sending subsequent data to another client device in order to minimize the number of transitions each link experiences between data frames and control frames. Transmitter control functions may be additionally required to periodically send one or more data frames to each client device even if there is no data to send to the particular client device, in order to maintain timing recovery and gain adjustments in all client devices. To accomplish this, the transmitter would fill one or more data frames with an idle pattern (e.g. scrambled ones) which offers an adequate signal to enable the client receiver to track the required parameters. Regardless of implementation options, each client receiver would compute signal-to-noise ratio (SNR) based on the signal power during reception of a data frame. Otherwise SNR computations might be misleading, and would potentially result in undesirable effects within the receiver. Some type of windowing of the received signal might also be required in order to minimize the transient effects of boundaries between data frames and control frames.

Figure 3:
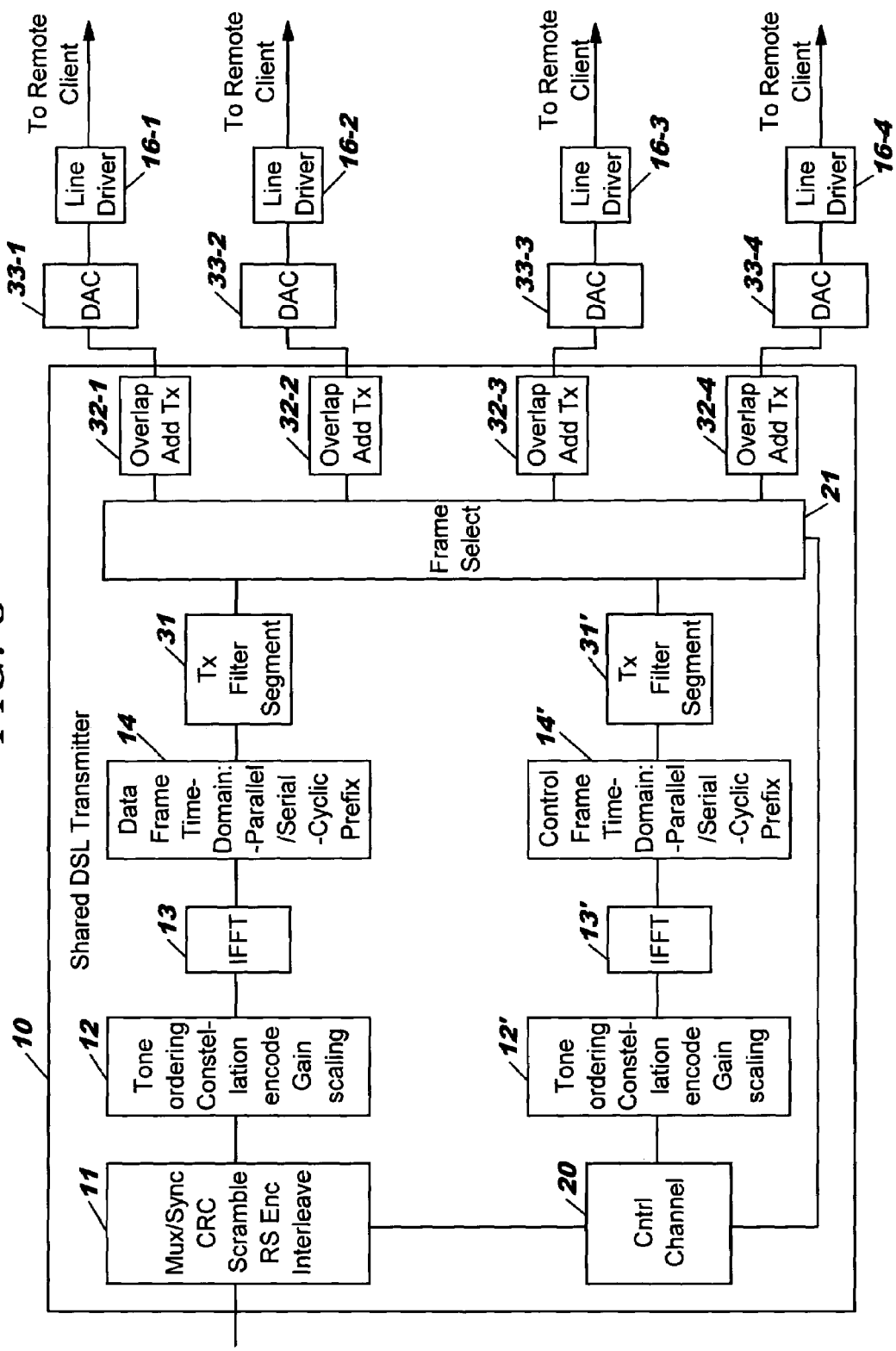

FIG. 3 illustrates another implementation in which the transmit filter 31/31' implementation is optimized. If the transmit filter is based on a FIR filter structure, then the filtering for each data and control frame only needs to be done once. When an isolated set of N time-domain samples representing one physical frame are passed through an FIR filter of length M, the number of output samples expands due to the convolution process to M+N−1 samples. In order to provide functional equivalence with the system depicted in FIG. 2, these isolated filter outputs from consecutive frame times must be partially overlapped. This is accomplished in Overlap Add Tx blocks 32-1 to 32-4. Assuming the filter length M is less than the number of samples N in one frame, N−M+1 samples are taken directly from the appropriate filter segment output buffer (either data frame or control frame), but the first M−1 samples are added to the last M−1 samples from the previous frame. It can be shown that this is mathematically equivalent to the separate filter per line illustrated in FIG. 2, but results in a significantly lower computational load since only two filters need to be implemented. In this embodiment (as well as the embodiment illustrated in FIG. 2) individual D/A converters 33-1 to 33-4 are provided for each DSL.

Figure 4:
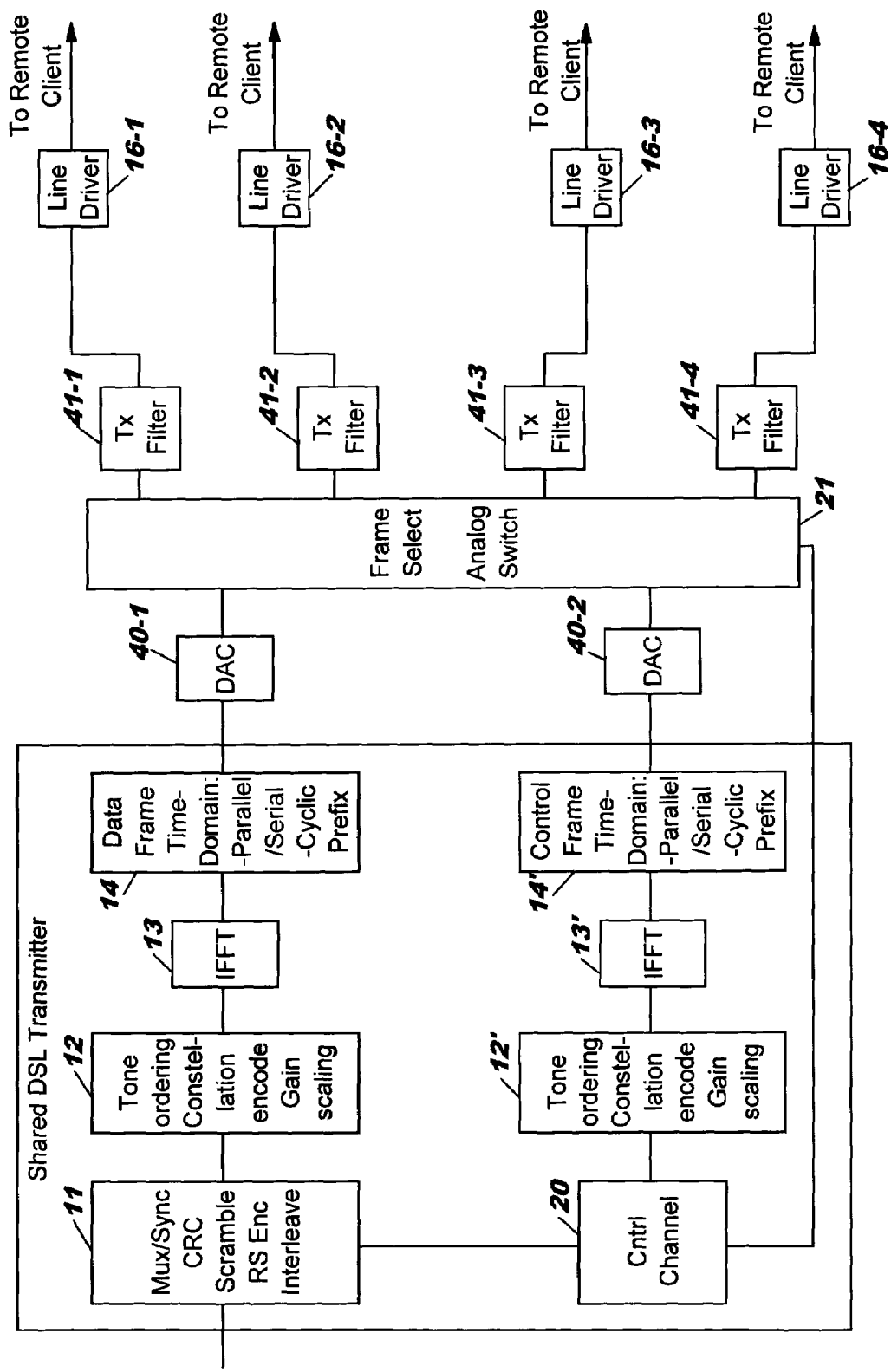

FIG. 4 illustrates another functionally equivalent implementation of the invention in which the transmit filter is pushed outward into the analog domain. The benefit of this alternative is that only two DAC's 40-1 and 40-2 are required, one for the full data frame and the other for the control frame. One or the other of these signals is routed to each transmit filter, according to which remote client the data frame is addressed to. The individual analog transmit filters 41-1 to 41-4 smooth transitions from control frames to data frames (and visa versa). This implementation results in reduced complexity for the digital portion of the design, shown in FIG. 4 as the Shared DSL Transmitter. The analog portion of the design may be more or less complex than the other alternatives, depending on the relative complexity of the analog transmit filters and analog switches as compared to the per line DACs which are not needed in this design.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural and /or functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

What is claimed is:

1. A shared Digital Subscriber Line (shared DSL) modem for connecting a plurality of Digital Subscriber Lines (DSLs) connected to individual client modems to a source of digital signals intended for the individual client modems comprising:

first means responsive to the source of digital signals for generating a first physical frame for an intended recipient client modem, said frame including a control field for indicating which of the plurality of client modems connected via a DSL to the shared DSL modem is the intended recipient of the frame and a data field in the frame;

second means responsive to signals from the first means for generating a second physical frame identical to the first physical frame less the data field intended for the client modem identified in the control field; and, third means responsive to signals from the second means for transmitting the first physical frame over the DSL connected to the client modem identified in the control field and transmitting the second physical frame to all of the other client modems.

2. The shared DSL modem set forth in claim 1 in which the third means includes:

a selector responsive to a control signal provided by the second means for directing the first physical frame from the first means to the DSL connected to the client modem identified in the control field and directing the second physical frame from the second means to all of the other DSL.

3. The shared DSL modem set forth in claim 2 in which the third means includes for each DSL:

a transmission filter or a digital-to-analog converter connected to a line driver wherein either transmission filter or the digital-to-analog converter is connected to the selector.

4. The shared DSL modem set forth in claim 2 in which the third means includes:

a first and second transmission filter between the selector means and the first and second means, respectively;

a line driver means for each DSL; and, an overlap addition means and digital-to-analog converter means connected between each line driver means and the selector means.

5. The shared DSL modem set forth in claim 2 in which the third means includes:

a first and second digital-to-analog converter between the selector and the first and second means, respectively;

a line driver means for each DSL; and, transmission filter means connected between each line driver means and the selector.

6. A shared DSL modem as set forth in any one of claims 1–5 in which the second physical frame includes a low power signal.

7. The shared DSL modem of claim 1 wherein the third means includes a switch.

8. A shared Digital Subscriber Line (shared DSL) modem for connecting a plurality of Digital Subscriber Lines (DSLs) connected to individual client modems to a source of digital signals intended for the individual client modems comprising:

first means responsive to the source of digital signals for generating a first physical frame for an intended recipient client modem including a control field identifying which of the plurality of client modems connected via a DSL to the shared DSL modem is the intended recipient of the frame and a data field;

second means responsive to the first means for preparing the first physical frame for transmission over a DSL;

third means responsive to the first means for generating a second physical frame which includes at least a control field identical to the control field in the first physical frame;

fourth means responsive to the third means for preparing the second physical frame for transmission over a DSL; and, fifth means responsive to the second and fourth means for contemporaneously transmitting the prepared first physical frame from the second means over the DSL connected to the client modem identified in the control field and transmitting the prepared second physical frame from the fourth means to all of the other client modems.

9. The shared DSL modem set forth in claim 8 in which the fifth means includes:
   a selector responsive to the control field provided by the third means for directing the first physical frame from the second means to the DSL connected to the client modem identified in the control field and directing the prepared second physical frame from the fourth means to all of the other client modems.

10. The shared DSL modem set forth in claim 9 in which the fifth means includes for each DSL:
    a transmission filter or a digital-to-analog converter connected to a line driver wherein either transmission filter or the digital-to-analog converter is connected to the selector.

11. The shared DSL modem set forth in claim 9 in which the fifth means includes:
    a first and second transmission filter between the selector and the second and fourth means, respectively;
    a line driver means for each DSL; and,
    an overlap addition means and digital-to-analog converter means connected between each line driver means and the selector.

12. The shared DSL modem set forth in claim 9 in which the fifth means includes:
    a first and second digital-to-analog converter between the selector means and the second and fourth means, respectively;
    a line driver means for each DSL; and,
    a transmission filter means connected between each line driver means and the selector.

13. A shared DSL modem as set forth in any one of claims 8–12 in which the second physical frame includes low power signal components.

14. In a shared Digital Subscriber Line (shared DSL) modem, a method for connecting a plurality of Digital Subscriber Lines (DSLs) connected to individual client modems to a source of digital signals intended for the individual client modems comprising:
    generating a first physical frame for an intended recipient client modem including a control field indicating which of the plurality of client modems connected via a DSL to the shared DSL modem is the intended recipient of the frame and a data field;
    generating a second physical frame identical to the first physical frame less the data field intended for the client modem identified in the control field; and,
    transmitting the first physical frame over the DSL connected to the client modem identified in the control field transmitting the second physical frame to all of the other client modems.

15. The method set forth in claim 14 in which a low power synchronization signal component is included in the generated second physical frame.

* * * * *

UNITED STATES PATENT AND TRADEMARK OFFICE
CERTIFICATE OF CORRECTION

PATENT NO. : 6,965,637 B2  
DATED : November 15, 2005  
INVENTOR(S) : Gordon Taylor Davis et al.

It is certified that error appears in the above-identified patent and that said Letters Patent is hereby corrected as shown below:

<u>Column 3,</u>  
Line 26, should read:  
-- 20 receives sufficient information from block 11 to generate --.

<u>Column 6,</u>  
Line 21, should read:  
-- the other DSLs. --.

<u>Column 8,</u>  
Line 25, should read:  
-- field and transmitting the second physcial frame to all of the --.

Signed and Sealed this

Sixth Day of June, 2006

JON W. DUDAS  
*Director of the United States Patent and Trademark Office*